Jan. 17, 1939.  J. KOTCH  2,144,187
DEFLATION INDICATOR
Filed Nov. 22, 1937
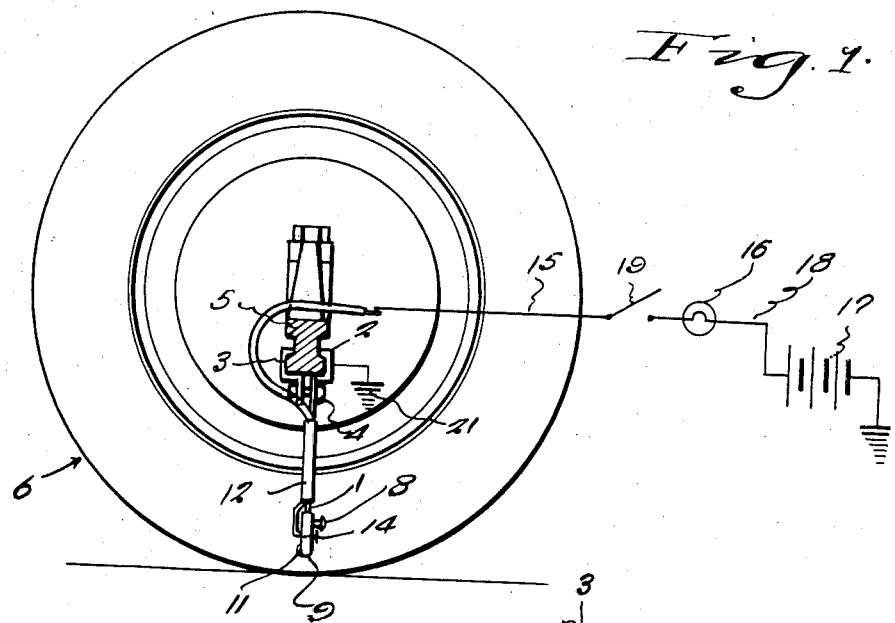
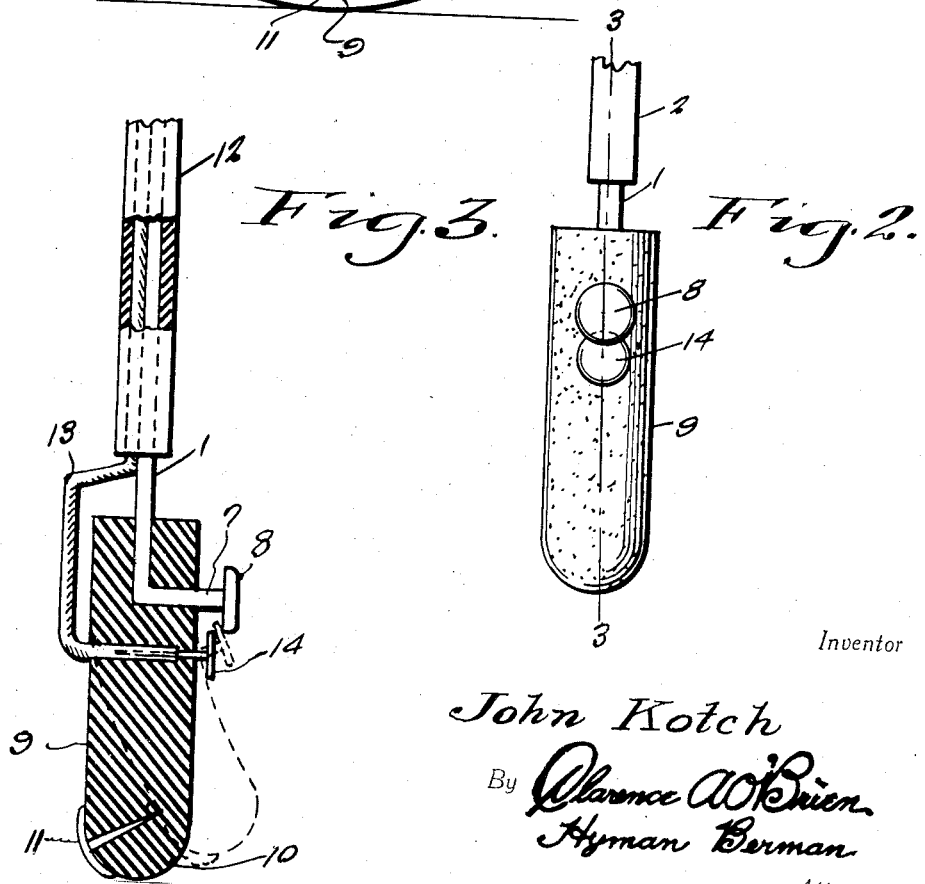
Inventor
John Kotch
By Clarence A. O'Brien
Hyman Berman
Attorneys Patented Jan. 17, 1939

2,144,187

UNITED STATES PATENT OFFICE 2,144,187

DEFLATION INDICATOR

John Kotch, Warren, Ohio

Application November 22, 1937, Serial No. 175,955

1 Claim. (Cl. 200—58)

My invention relates to signalling devices and more particularly to so-called deflation indicators for use in conjunction with automobile tires to indicate to the driver under-inflation of the tires.

The principal object of my invention, generally stated, is to provide an efficient device of this character which is simple in construction, adapted to withstand wear and rough usage, may be readily attached to present day makes of automobiles, and is reliable in operation.

To the accomplishment of the above, and other objects presently appearing, a preferred embodiment of my invention has been illustrated in the accompanying drawing, set forth in detail in the succeeding description, and defined in the claim appended hereto.

In said drawing:—

Figure 1 is a view partly in section and partly in side elevation taken through an axle of an automobile and illustrating a preferred application of my invention, Figure 2 is a fragmentary view in rear elevation, drawn to an enlarged scale, and Figure 3 is a view in vertical section taken on the line 3—3 of Figure 2.

Describing my invention in detail, with reference to the drawing by numerals, the basic element thereof is a hanger element comprising a small steel rod 1 secured at one end to, or having formed therewith if desired, a U-shaped clamping member 2 cooperatng with a similar clamping member 3, and a suitably disposed clamping bolt 4 to secure said rod 1 to the axle 5 of an automobile in a position to depend therefrom adjacent the inner side of one of the tires 6 of said automobile. The lower end of the rod 1 is bent rearwardly at a right angle, as at 7, and provided with a terminal button-like contact member 8. If desired the rod 1 may be flexible.

Depending from the lower end of the rod 1 is a flexible ground engaging member 9 of insulation material and preferably having the form of an elongated block of rubber secured at its upper end to said rod by imbedding the lower end of the latter therein as shown in Figure 3, the arrangement being such that the contact member 8 is spaced slightly from the rear of said member 9. As will be understood the described parts are so dimensioned that the lower end of the ground engaging member 9 is spaced from the ground under normal inflation pressure in the tire 6 to be engaged with the ground under a selected pressure below normal. If desired the rod 1 may be adjustably mounted, in any suitable manner, on the axle 5 to accomplish the same purpose. The lower end of the ground-engaging member 9 is preferably rounded, as at 10, and provided with a forwardly located shoe, as at 11, to protect said end against wear. Intermediate the clamping member 2 and ground engaging member 9 a sleeve 12 of suitable insulation material is secured to the rod 1 with the latter extending therethrough, said sleeve functioning as a keeper for an insulated conductor wire 13 extending downwardly through the sleeve and having its lower end inserted in the ground engaging member 9 from the front of the latter and below the contact member 8. A nail-like contact member 14 is driven into the ground engaging member 9 from the rear thereof, and into the inserted end of the conductor 13, as shown in Figure 3, and so that the head of the contact member 14 is normally spaced from the contact member 8 but will be engaged with the latter under rearward flexing of the lower portion of the ground engaging member 9 as illustrated in dotted lines in Figure 3. The upper end of the conductor wire 13 is connected, as by a lead wire 15, to one terminal of an electric light bulb 16 suitably arranged in the automobile and having its other terminal connected to the usual battery 17 as by the lead 18. A switch 19 is interposed in the line of connection between the conductor wire 13 and the bulb 16.

Referring to the operation of the described device, when the ground engaging member 9 flexes in the manner and under the conditions previously described, the contact member 14 is engaged with the contact member 8 thereby closing the circuit from the battery 17 through the bulb 16, switch 19, conductor wire 13, contacts 14 and 8, and by way of rod 1 to ground, as indicated at 21, it being understood that the rod 1 is grounded to the automobile frame by the clamping member 2. The consequent lighting of the bulb 16 instantly indicates to the driver that the tire needs attention so that he may stop before irreparable injury is done to the tire.

The foregoing will, it is believed, suffice to impart a clear understanding of the invention without further explanation.

Manifestly, modification in structural details and relation of parts described may be resorted to without departing from the inventive concept disclosed and right is herein reserved to all such modifications falling within the scope of the subjoined claim.

What I claim is:

Tire deflation indicating apparatus for use on an automobile comprising a rod-like hangar for attachment to an axle of the automobile to depend therefrom alongside a tire and having a lower right angled end terminating in a contact button, clamping means on the upper end of said rod for attaching the same to said axle with the right angled end thereof extending rearwardly, a solid shaft of flexible insulating material depending from said lower end of the hanger for engagement with the ground and rearward flexing under forward traveling of the automobile, said lower end of the hanger being imbedded in the upper end of the shaft with the button thereof located in the rear of said shaft, a contact member on said shaft extending rearwardly thereof for engagement with the contact button under flexing of said shaft, and a lead secured at one end to said contact member and to said hangar alongside the same.

JOHN KOTCH.